May 15, 1956     T. H. OSTER     2,745,733
APPARATUS AND PROCESS FOR REDUCTION OF ORES TO METAL
Filed Oct. 24, 1952
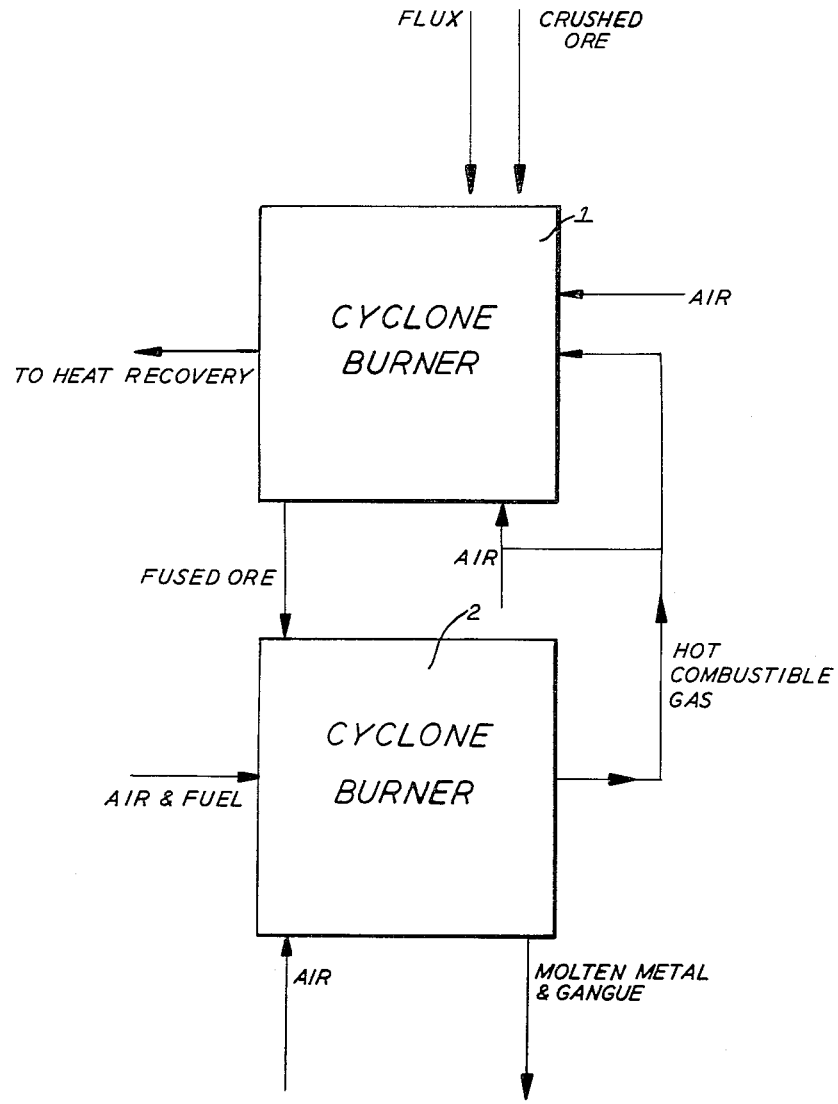
THOMAS H. OSTER
INVENTOR
BY E. C. McRae
J. R. Faulkner
ATTORNEYS United States Patent Office 2,745,733
Patented May 15, 1956

2,745,733
APPARATUS AND PROCESS FOR REDUCTION OF ORES TO METAL

Thomas H. Oster, Dearborn, Mich., assignor to Ford Motor Company, Dearborn, Mich., a corporation of Delaware Application October 24, 1952, Serial No. 316,708

11 Claims. (Cl. 75—40)

This invention is concerned with the art of utilizing fuels and more particularly with a process for the combustion of fuels and the concomitant treatment of metallic ores to recover the metallic values therefrom in a more concentrated condition. This invention is related to my copending application, Serial No. 253,890, filed October 31, 1951, entitled Combustion Process, and also to my application Serial No. 317,282, filed October 28, 1953, and entitled Combustion Process.

It is contemplated that the process of this invention be carried out in a device known as a cyclone burner. Briefly, this device comprises a water cooled steel cylinder usually placed with its axis slightly inclined from the horizontal and provided at one end with means for the reception of a stream of fuel and primary air and at the other end with an exit for the products of combustion. This type of burner and its operating characteristics are amply and ably described in an article entitled "The horizontal cyclone burner" by A. E. Grunert, L. Skog and L. S. Wilcoxson, appearing at page 613 et seq. of the American Society of Mechanical Engineers, Transaction, volume 69, 1947.

As the known supplies of high grade metallic ores have become depleted, it has been necessary to resort to leaner and leaner ores for the metals necessary for our day to day life. In these lean ores, the desired metallic values are associated with large amounts of worthless gangue. To separate the metallic values from the gangue and obtain the desired high metal concentration, it is usually necessary to resort to crushing and grinding followed by a separation step such as flotation, electrostatic separation, magnetic separation, or other procedure dependent upon chemical or physical differences between the metal desired and the gangue. These concentration procedures are costly and almost invariably involve a sacrifice of metal values. The higher concentration of metal desired the higher is usually the loss of metal values to the tailing pile. The instant invention has been developed to increase the range of ores which may be treated without resort to the usual concentration processes.

As described and claimed in the applications mentioned above, it is possible to operate a cyclone burner with either a solid fuel or fluid fuel, and to introduce a metal ore into the burner and by a judicious choice of the oxidation level in the burner, to recover from the burner either a fused ore or a reduced metal.

In many instances, even when operating with a relatively concentrated ore it is difficult to simultaneously maintain the desired oxidation level within the burner and to maintain a temperature which will keep all materials within the burner except carbon either liquid or gaseous. To maintain these necessary conditions simultaneously resort must be had either to highly preheating the incoming air, or to enriching the incoming air with oxygen, or to a combination of these expedients. In many instances when the gangue content of the ore is too high, it is impracticable to maintain the necessary temperature and reducing conditions within the burner due to the large amount of energy required to heat and melt the gangue. This energy amounts to approximately one thousand British Thermal Units per pound. To circumvent this difficulty resort is had to a dual cyclone burner. This method and the associated apparatus are probably best understood by reference to the figure of drawing which is a schematic representation.

In the drawing cyclone burner 1 is shown above cyclone burner 2 and in practice this arrangement should be followed so that molten materials may be transferred by gravity from cyclone burner 1 to cyclone burner 2. It is preferred that practically all of the fuel introduced into the system enter cyclone burner 2 and be introduced along with a stream of primary air or other oxidizing gas such as oxygen enriched air or oxygen of any desired degree of purity. As those skilled in the art will appreciate, the bulk of the air necessary for combustion in cyclone burners is introduced not in the primary air stream, but in a rapidly moving stream of secondary air which is injected into the burner tangentially so that a swirling motion is set up therein and any given particle will pass through the burner in a generally helical path. The oxidation level in cyclone burner 2 is adjusted to yield the desired degree of reduction of any metal ore passing through this burner. When the usual fuels such as coal, coke, petroleum or natural or artificial gas is used, the gaseous effluent from cyclone burner 2 will be very hot and contain large quantities of combustible gases such as carbon monoxide and hydrogen. This gaseous effluent of cyclone burner 2 which is rich in both sensible and latent heat is transferred to cyclone burner 1 through a well insulated conduit and preferably serves as the sole fuel for cyclone burner 1. The gaseous effluent from cyclone burner 1 is of necessity very hot and is passed to a steam generator, or air preheater or other device for the recovery of its sensible heat.

Crushed, but not necessarily pulverized ore is introduced into cyclone burner 1 with, or at least near the point of entrance of the hot fuel gas from cyclone burner 2. The sensible heat in these hot combustible gases from cyclone burner 2, plus the heat released when they react with the air introduced in cyclone burner 1 maintains the interior of cyclone burner 1 above the melting point of the ore, modified if necessary by the addition of an appropriate flux. The molten ore will form a liquid coating over the interior of the burner and this liquid will describe a helical path towards the discharge end of the burner. The crushed pieces of ore will be hurled to the inner surface of the burner by centrifugal force and trapped in the molten ore layer until they are in turn melted.

The fused ore produced in cylcone burner 1 is transferred immediately to cyclone burner 2 preferably by gravity and through a well insulated conduit to prevent the loss of heat. The air and fuel introduced into cyclone burner 2 are so proportioned that the interior of this cyclone burner will be maintained under conditions reducing to the metal it is desired to recover. The heat of the combustion of fuel in cyclone burner 2 serves to maintain this burner at a temperature necessary to maintain all of the reactants except carbon in either the liquid or gaseous state and to reduce the ore to the metal. The exact temperature to be maintained, and the severity of the reducing conditions to be established in cyclone burner 2 depend upon such factors as the cost of fuel, the cost of ore, the value of the metal produced, and strictly local factors so that it is impossible to set these conditions forth quantitatively. They should be determined for each particular operation.

In many instances the operation of this process with air at atmospheric temperatures will be found to be impossible. Under these conditions resort must be had to the use of highly preheated air or oxygen enriched air or both. It is to be understood that preheated air or oxygen enriched air are not strictly alternatives, but can be used either separately or together depending upon the ore and local economic conditions. In any event, the heat introduced into cyclone burner 2 in the fused ore, plus the heat introduced in the air plus the heat of combustion taking place in the burner must equal or exceed the heat leaving the burner in the molten metal and gangue, plus the latent and sensible heat in the hot gas effluent plus the heat losses from the burner through radiation, cooling water, etc., plus the heat necessary for the reduction of the metal.

Similarly in cyclone burner 1, the sensible heat in the hot gases from cyclone burner 2, plus the heat of combustion of these gases, plus the heat brought in in preheated air must equal or exceed the heat necessary to heat and fuse the ore introduced plus radiation and cooling water losses from the cyclone burner. Having been given these requirements, the degree of preheat necessary for the air supply to each cyclone burner, or the degree of oxygen enrichment or both may readily be calculated by one skilled in metallurgical and combustion calculations.

In most locations the primary fuel to be used in cyclone burner 2 will be crushed coal, although this is not necessary. The process will operate also upon coke, charcoal, petroleum or gas as the primary fuel. Lignite, brown coal and peat properly dried are workable fuels. Cyclone burner 1 has been described as fired only by gas from cyclone burner 2. However, this is not essential, albeit it is usually economically desirable. Under some circumstances such as where the metal being produced is readily reducible in the presence of large amounts of carbon dioxide and/or water vapor or where there is a large demand for heat as for steam raising or electric power, it may be more economical to fire cyclone burner 1 with fuel other than the hot gas from cyclone burner 2. The omnivorous characteristics of cyclone burners will permit almost any fuel to be employed here, either per se, or as an adjuvant to the hot gas from cyclone burner 2.

This process has been developed primarily for the low grade iron ores so plentifully distributed in the lithosphere although it is by no means so circumscribed. These low grade iron ores are almost invariably high in silica which renders their direct use in conventional blast furnaces impracticable. In the instant process, by a judicious choice of temperatures, the ore may be fused and the silica passed through the system as an inert diluent. The amount of silica reduced along with the iron will be increased with increasing temperatures in cyclone burner 2 and with increasing reducing agents, particularly if much solid fuel is trapped in the molten ore on the inner walls of cyclone burner 2. In many instances it will be found to be economically sound to discharge the molten slag countercurrent to the incoming air to recover at least a portion of the high thermal level heat available from this source. While a cyclone burner is the preferred instrumentality for the production of the molten ore, any suitable source of molten ore may be employed as a feed for cyclone burner 2 without departing from the scope of this invention.

I claim as my invention:

1. In an apparatus for the reduction of metals from lean ores, two cyclone burners arranged with the first cyclone burner at a higher elevation than the second cyclone burner, means for conducting the hot gaseous effluent from the second cyclone burner to the first cyclone burner, means for transferring by gravity molten ore from the first cyclone burner to the second cyclone burner, means for feeding crushed ore to the first cyclone burner, means for feeding fuel to the second cyclone burner and means for tapping from the second cyclone burner metal and slag.

2. In an apparatus for the reduction of metals from lean ores, two cyclone burners arranged adjacent each other, means for conducting the hot gaseous effluent from a second cyclone burner to a first cyclone burner, means for transferring molten ore from the first cyclone burner to the second cyclone burner, means for feeding crushed ore to the first cyclone burner, means for feeding fuel to the second cyclone burner and means for tapping from the second cyclone burner metal and slag.

3. In a process for the production of molten metal, the steps of melting an ore of said metal in a cyclone burner, transferring this molten metal ore to a second cyclone burner operating at least in part on solid fuel and under conditions reducing to said metal, reducing the metal ore to metal in the second cyclone burner, and tapping the molten metal and slag from the second cyclone burner, said first cyclone burner obtaining at least part of its fuel from the gaseous effluent of the second cyclone burner.

4. In a process for the production of molten metal, the steps of melting an ore of said metal by combustion of fuel in a cyclone burner, transferring this molten metal ore to a second cyclone burner operating at least in part on solid fuel and under conditions reducing to said metal, burning fuel and reducing the metal ore to metal in the second cyclone burner, and tapping the molten metal and slag from the second cyclone burner.

5. In a process for the production of molten iron, the steps of melting an ore of iron in a cyclone burner, transferring this molten iron ore to a second cyclone burner operating at least in part on solid fuel and under conditions reducing iron ore to iron, reducing the metal ore to metal in the second cyclone burner, and tapping the molten iron and slag from the second cyclone burner, said first cyclone burner obtaining at least part of its fuel from the gaseous effluent of the second cyclone burner.

6. In a process for the production of molten iron, the steps of melting an ore of iron by combustion of fuel in a cyclone burner, transferring this molten iron ore to a second cyclone burner operating at least in part on solid fuel and under conditions reducing iron ore to iron, burning fuel and reducing the metal ore to metal in the second cyclone burner, and tapping the molten iron and slag from the second cyclone burner.

7. In a process for the production of molten metal, the steps of melting an ore of said metal in a cyclone burner, transferring this molten metal ore to a second cyclone burner operating under conditions reducing to said metal, reducing the metal ore to metal in the second cyclone burner, and tapping the molten metal and slag from the second cyclone burner, said first cyclone burner obtaining at least part of its fuel from the gaseous effluent of the second cyclone burner.

8. In a process for the production of molten iron, the steps of melting an ore of iron in a cyclone burner, transferring this molten iron ore to a second cyclone burner operating under conditions reducing iron ore to iron, reducing the metal ore to metal in the second cyclone burner, and tapping the molten iron and slag from the second cyclone burner, said first cyclone burner obtaining at least part of its fuel from the gaseous effluent of the second cyclone burner.

9. In a process for the production of molten metal, the steps of introducing a crushed ore, fuel and a preheated stream of air into a cyclone burner, causing the ore, fuel and air to follow a spiral course through the burner, causing the fuel, air and ore to react in the burner, tapping the ore from the burner and reducing the ore so treated, the amounts of air, fuel and ore being regulated so that the heat delivered to the burner in the preheated air plus the net heat evolved in the burner is greater than the heat removed in the gaseous products of combustion plus the heat abstracted by the burner through radiation and cooling plus the heat necessary to heat the ore to the fusion point and fuse it.

10. In a process for the production of molten metal, the steps of fusing a metal oxide, transferring the fused metal oxide to a cyclone burner, introducing into said cyclone burner preheated air and fuel and regulating the amounts of metal oxide, air and fuel so that conditions reducing to the metal oxide are produced, burning the fuel and reducing the ore, tapping the molten metal and removing the products of combustion.

11. In a process for the production of molten metal, the steps of fusing a metal oxide, transferring the fused metal oxide to a cyclone burner, introducing into said cyclone burner preheated air and fuel and regulating the amounts of metal oxide, air and fuel so that conditions reducing to the metal oxide are produced, burning the fuel and reducing the ore, tapping the molten metal and removing the products of combustion, said products of combustion being then admixed with air and employed as fuel to melt further metal oxide.

References Cited in the file of this patent

UNITED STATES PATENTS

| | | |
|---|---|---|
| 195,891 | Hamilton | Oct. 9, 1877 |
| 369,361 | Norris | Sept. 6, 1887 |
| 859,572 | McDonald | July 9, 1907 |
| 1,490,012 | Kapteyn | Apr. 8, 1924 |
| 1,524,182 | Kjolberg | Jan. 27, 1925 |